United States Patent
Kim et al.

(10) Patent No.: US 11,315,697 B1
(45) Date of Patent: Apr. 26, 2022

(54) FINES REMOVAL APPARATUS INSTALLED ON RADIOACTIVE LIQUID WASTE GRANULAT

(71) Applicant: JS CHEM CORPORATION, Jeollabuk-do (KR)

(72) Inventors: Yong Hyun Kim, Wanju-gun (KR); Seok Hee Im, Wanju-gun (KR); Dong Hoon Oh, Wanju-gun (KR); Kyoung Hwan Joung, Wanju-gun (KR); Seong Kyun Im, Wanju-gun (KR)

(73) Assignee: JS CHEM CORPORATION, Wanju-gun (KR)

( * ) Notice: Subject to any disclaimer, the term of this patent is extended or adjusted under 35 U.S.C. 154(b) by 0 days.

(21) Appl. No.: 17/384,239

(22) Filed: Jul. 23, 2021

(30) Foreign Application Priority Data

May 28, 2021 (KR) .................. 10-2021-0069029

(51) Int. Cl.
| | | |
|---|---|---|
| *G21F 9/08* | (2006.01) | |
| *G21F 9/34* | (2006.01) | |
| *G21F 9/16* | (2006.01) | |
| *B01D 1/18* | (2006.01) | |
| *B01D 37/00* | (2006.01) | |

(52) U.S. Cl.
CPC .............. *G21F 9/08* (2013.01); *G21F 9/34* (2013.01); *B01D 1/18* (2013.01); *B01D 37/00* (2013.01); *G21F 9/165* (2013.01); *G21F 9/167* (2013.01)

(58) Field of Classification Search
CPC ... G21F 9/08; G21F 9/34; G21F 9/165; G21F 9/167; B01D 1/18; B01D 7/00
USPC .................................................. 588/1
See application file for complete search history.

(56) References Cited

U.S. PATENT DOCUMENTS

2018/0231312 A1    8/2018 Moricca et al.

FOREIGN PATENT DOCUMENTS

| JP | 2020-508429 A | 3/2020 |
|---|---|---|
| KR | 10-0299100 B1 | 10/2001 |
| KR | 10-0498881 B1 | 7/2005 |
| KR | 10-0933561 B1 | 12/2009 |
| KR | 10-2012-0083133 A | 7/2012 |
| KR | 10-1224725 B1 | 1/2013 |
| KR | 10-1223167 B1 | 2/2013 |
| KR | 10-2020-0004575 A | 1/2020 |

OTHER PUBLICATIONS

Office Action dated Sep. 23, 2021 for related Korean Patent Application No. 10-2021-0069029.
Decision to Grant a Patent dated Nov. 29, 2021 for related Korean Patent Application No. 10-2021-0069029.

*Primary Examiner* — Edward M Johnson
(74) *Attorney, Agent, or Firm* — Sughrue Mion, PLLC (57) ABSTRACT

Proposed is a fines removal apparatus installed on a radioactive liquid waste granulator, the apparatus including: a body unit fastened to an outlet provided on the radioactive liquid waste granulator and configured to receive the granulated radioactive waste by an operation of a first opening/closing valve, the radioactive liquid waste granulator being configured to manufacture concentrated liquid waste and to manufacture granulated radioactive waste by drying the concentrated liquid waste. an air supply unit provided on one side of the body unit and configured to spray air to the supplied granulated radioactive waste at regular periods, thereby scattering and separating fines contained in the granulated radioactive waste; and a reprocessing unit provided in a vacuum state on an opposite side of the body unit and configured to allow the scattered fines to be transferred to the radioactive waste granulator along a transfer pipe by vacuum pressure.

4 Claims, 5 Drawing Sheets

FINES REMOVAL APPARATUS INSTALLED ON RADIOACTIVE LIQUID WASTE GRANULAT

CROSS REFERENCE TO RELATED APPLICATION

The present application claims priority to Korean Patent Application No. 10-2021-0069029, filed May 28, 2021, the entire contents of which is incorporated herein for all purposes by this reference.

BACKGROUND OF THE INVENTION

Field of the Invention

The present disclosure relates to a fines removal apparatus installed on a radioactive liquid waste granulator. More particularly, the present disclosure relates to a fines removal apparatus installed on a radioactive liquid waste granulator for efficiently performing solidification of granulated radioactive liquid waste by spraying air into the granulated radioactive waste at regular periods to separate and reprocess fines contained in the granulated radioactive waste.

Description of the Related Art

In general, the amount of radioactive waste generated from nuclear power plants, research institutes, or the like is very small compared to that of household or industrial waste, but a fatal risk of radiation leakage is high and a treatment period is very long, so safety in a post-treatment process thereof is required to be secured. Treatment of radioactive waste is a method to reduce an effect of radiation on the environment, wherein the method solidifies the radioactive waste using a polymer, paraffin, cement, or the like. Here, radioactive liquid waste of the radioactive waste is made into granulated radioactive waste by concentrating and drying a large amount of moisture contained therein. Subsequently, the granulated radioactive waste is placed in a specified drum and is subject to solidification treatment by injecting a solidifying agent (solidifying resin) such as polymer, paraffin, cement, or the like into an inner side of the drum.

In addition, in the conventional art, the radioactive liquid waste is concentrated and dried as described above to make granulated radioactive waste, and in in such a process, the granulated radioactive waste contains a certain amount of fines.

Such fines are not solidified when the radioactive waste in a granular state is mixed with a solidifying agent (solidifying resin), which causes a problem in that precisely solidifying the radioactive waste is difficult.

DOCUMENTS OF RELATED ART

Patent Document (Patent Document 1) Korean Patent No. 10-1223167

SUMMARY OF THE INVENTION

Accordingly, the present disclosure has been made keeping in mind the above problems occurring in the related art, and an objective of the present disclosure is to provide a fines removal apparatus installed on a radioactive liquid waste granulator for efficiently performing solidification of granulated radioactive liquid waste by spraying air into the granulated radioactive waste at regular periods to separate and reprocess fines contained in the granulated radioactive waste.

Another objective of the present disclosure is to provide the fines removal apparatus installed on a radioactive liquid waste granulator for efficiently performing reprocessing by scattering the fines contained in the granulated radioactive waste dispersed in an internal blind spot of a body unit through a plurality of air supply nozzles formed in a circumferential direction along the width direction of the air supply pipe.

The objectives of embodiments of the present disclosure are not limited to the above-mentioned objectives, and other objectives not mentioned will be clearly understood by those of ordinary skill in the art to which the present disclosure belongs from the following description.

In order to achieve the above objective, according to one aspect of the present disclosure, there may be provided a fines removal apparatus installed on a radioactive liquid waste granulator, the apparatus including: a body unit fastened to an outlet provided on the radioactive liquid waste granulator and configured to receive granulated radioactive waste by an operation of a first opening/closing valve provided at one side of the outlet, the radioactive liquid waste granulator being configured to manufacture concentrated liquid waste by evaporating moisture in radioactive liquid waste and to manufacture granulated radioactive waste by drying the concentrated liquid waste. an air supply unit provided on one side of the body unit and configured to spray air to the supplied granulated radioactive waste at regular periods, thereby scattering and separating fines contained in the granulated radioactive waste; and a reprocessing unit provided in a vacuum state on an opposite side of the body unit and configured to allow the scattered fines to be transferred to the radioactive waste granulator along a transfer pipe by vacuum pressure when a second opening/closing valve provided on one side of the body unit is operated.

In addition, according to an embodiment of the present disclosure, the air supply unit may include: an air supply pipe provided in a width direction inside the body unit and formed with a plurality of air supply nozzles in a circumferential direction along the width direction; and an air supply part connected to the air supply pipe and configured to supply air to the inside of the body unit through the air supply pipe.

In addition, according to the embodiment of the present disclosure, the apparatus may further include an air chamber provided between the air supply pipe and the air supply part and configured to collect the supplied air.

In addition, according to the embodiment of the present disclosure, the apparatus may further include a fines separation filter provided at a connection part, where the main unit and the reprocessing unit are connected to each other, the fines separation filter being configured to perform filtering of the granulated radioactive waste of large-sized particles and the fines of small-sized particles.

In addition, according to the embodiment of the present disclosure, the fines separation filter may be configured to be curved at a predetermined angle and to have a mesh shape.

In addition, according to the embodiment of the present disclosure, the apparatus may further include a washing nozzle provided at one side of the fines separation filter and configured to spray the air to the granulated radioactive waste having large-sized particles and being adhered to the fines separation filter.

In addition, according to the fines removal apparatus installed on a radioactive liquid waste granulator of the present disclosure, there is an effect in that efficient solidification of the granulated radioactive liquid waste can be performed by spraying air into the granulated radioactive waste at regular periods to separate and reprocess the fines contained in the granulated radioactive waste.

In addition, there is an effect in that efficient reprocessing can be performed by scattering the fines contained in the granulated radioactive waste dispersed in an internal blind spot of a body unit through a plurality of air supply nozzles formed in the circumferential direction along the width direction of the air supply pipe.

BRIEF DESCRIPTION OF THE DRAWINGS

The above and other objectives, features, and advantages of the present disclosure will be more clearly understood from the following detailed description when taken in conjunction with the accompanying drawings, in which.

DETAILED DESCRIPTION OF THE INVENTION

The following objectives, other objectives, features, and advantages of the present disclosure will be readily understood through the following exemplary embodiments related to the accompanying drawings. However, the present disclosure is not limited to the embodiments described herein and may be embodied in other forms.

Meanwhile, the embodiments introduced herein are provided in order to allow the disclosed subject matter to be thorough and complete and the spirit of the present disclosure to be sufficiently conveyed to those skilled in the art.

The embodiments described and illustrated herein also include complementary embodiments thereof.

In the present specification, the singular also includes the plural, unless specifically stated otherwise in a phrase. As used herein, the terms "comprise" and/or "comprising" do not exclude the presence or addition of one or more other components.

Hereinafter, the present disclosure will be described in detail with reference to the drawings. In describing the specific embodiments below, various specific contents have been prepared to more specifically explain and help the understanding of the disclosure. However, those skilled in the art and having the knowledge to a degree to understand the present disclosure may recognize that the embodiments may be used even without such various specific details. In some cases, it is mentioned in advance that parts, which are commonly known in describing the disclosure but not largely related to the disclosure, may not be described in describing the present disclosure in order to avoid confusion.

Figure 1:
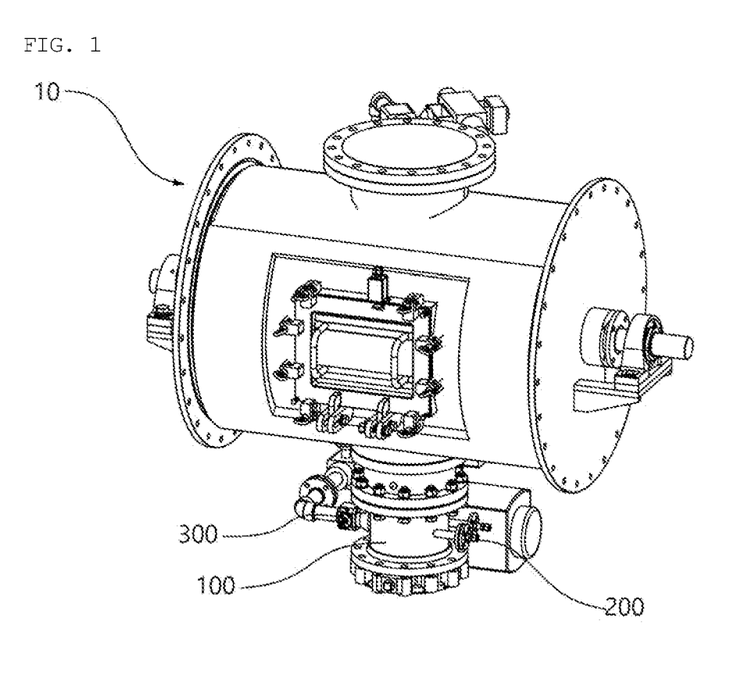
FIG. 1 is a perspective view showing a fines removal apparatus installed on a radioactive liquid waste granulator according to an embodiment of the present disclosure.
Figure 2:
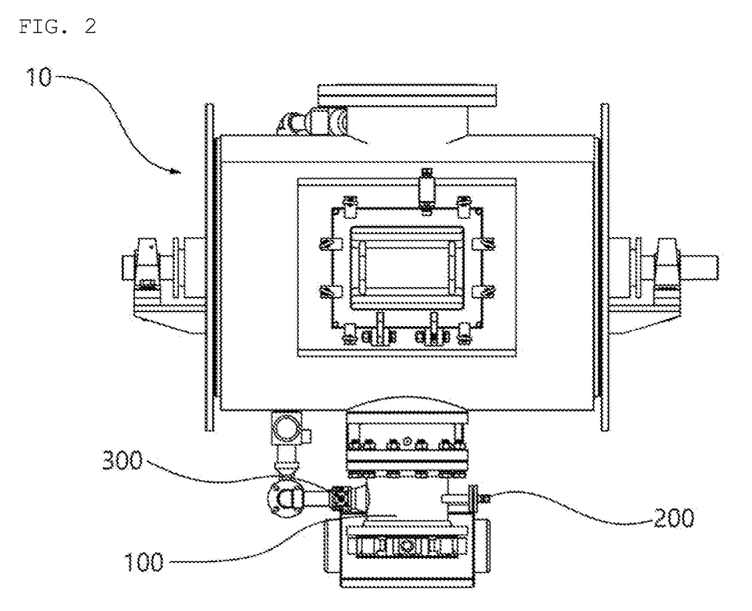
FIG. 2 is a front view showing the fines removal apparatus installed on a radioactive liquid waste granulator according to the embodiment of the present disclosure.
Figure 3:
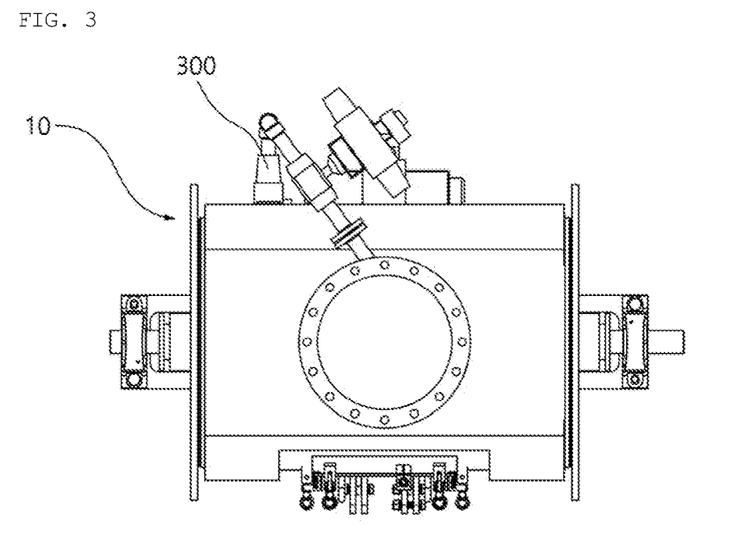
FIG. 3 is a plan view showing the fines removal apparatus installed on a radioactive liquid waste granulator according to the embodiment of the present disclosure.
Figure 4:
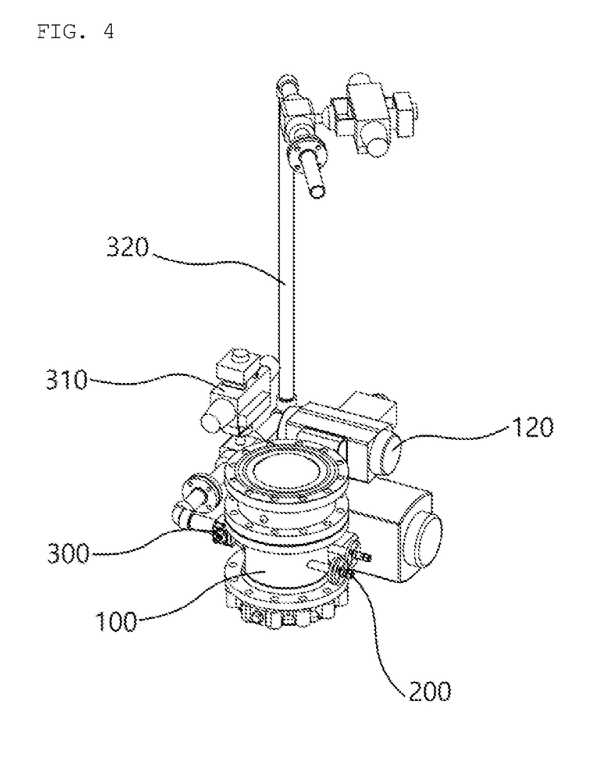
FIG. 4 is a perspective view showing the fines removal apparatus according to the embodiment of the present disclosure.
Figure 5:
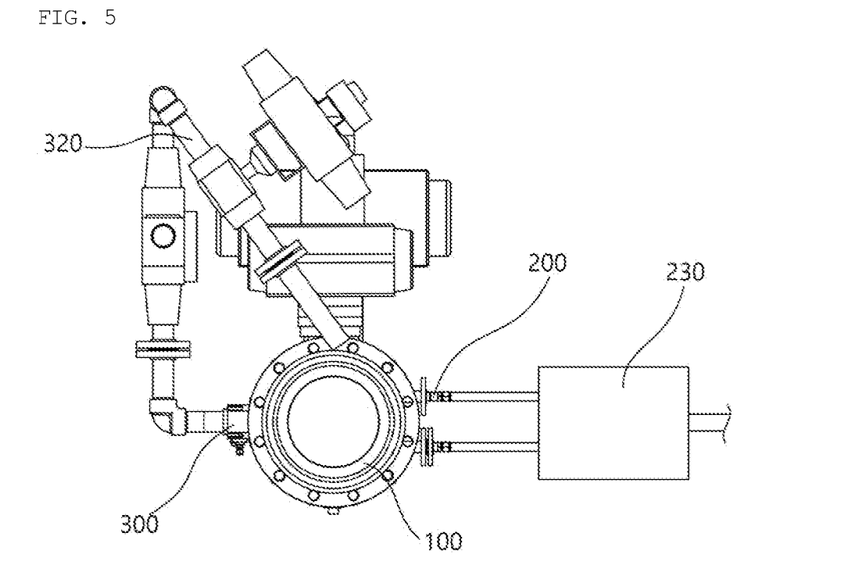
FIG. 5 is a plan view showing the fines removal apparatus according to the embodiment of the present disclosure.
Figure 6:
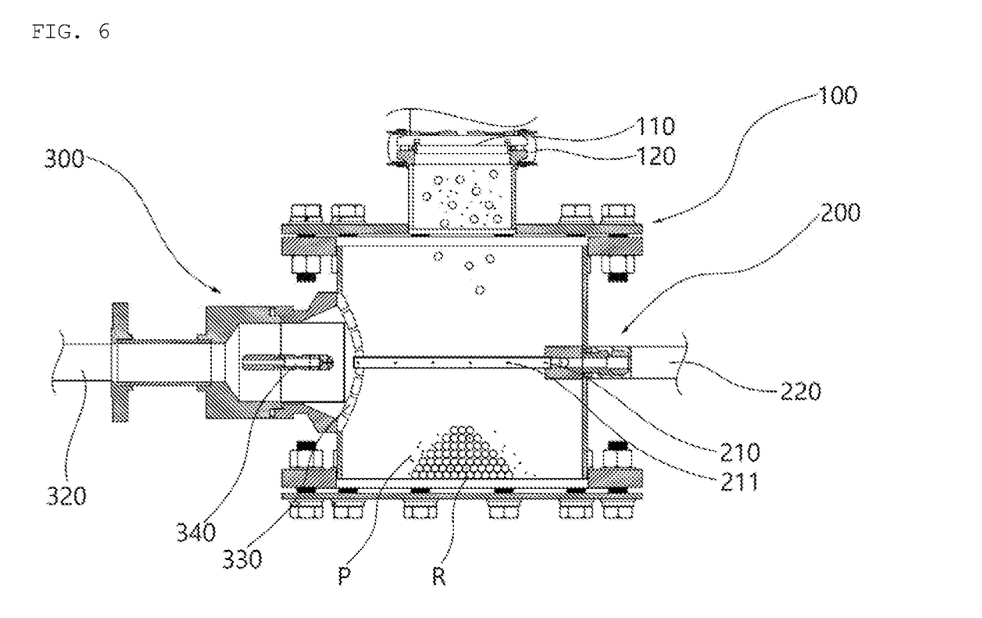
FIG. 6 is a sectional view showing the fines removal apparatus according to the embodiment of the present disclosure.

FIG. 1 is a perspective view showing a fines removal apparatus installed on a radioactive liquid waste granulator according to an embodiment of the present disclosure, FIG. 2 is a front view showing the fines removal apparatus installed on a radioactive liquid waste granulator according to the embodiment of the present disclosure, FIG. 3 is a plan view showing the fines removal apparatus installed on a radioactive liquid waste granulator according to the embodiment of the present disclosure, FIG. 4 is a perspective view showing the fines removal apparatus according to the embodiment of the present disclosure; FIG. 5 is a plan view showing the fines removal apparatus according to the embodiment of the present disclosure; and FIG. 6 is a sectional view showing the fines removal apparatus according to the embodiment of the present disclosure.

As shown in FIGS. 1 to 6, the fines removal apparatus installed on a radioactive liquid waste granulator of the present disclosure includes largely a body unit 100, an air supply unit 200, and a reprocessing unit 300.

First, the body unit 100 is fastened to an outlet 110 provided on the radioactive liquid waste granulator 10 and is configured to receive the granulated radioactive waste R by an operation of a first opening/closing valve 120 provided at one side of the outlet 110, wherein the radioactive liquid waste granulator 10 is configured to manufacture concentrated liquid waste by evaporating moisture in radioactive liquid waste and to manufacture granulated radioactive waste by drying the concentrated liquid waste.

On the other hand, the radioactive liquid waste granulator 10 has already been disclosed in the registered patent (Korea Patent No. 10-1223167, "Granulating device for radioactive wastewater") of the present applicant, so the detailed description will be omitted below.

The body unit 100 is configured to receive the granulated radioactive waste R manufactured in the radioactive liquid waste granulator 10 through the outlet 110.

Here, the outlet 110 may be opened and closed through the first opening/closing valve 120, wherein the first opening/closing valve 120 may easily open and close the outlet 110 through various opening/closing valves such as a solenoid valve, a check valve, a fly valve, and the like.

That is, when manufacturing of the granulated radioactive waste R in the radioactive liquid waste granulator 10 is completed, the granulated radioactive waste R may be quickly supplied to the inside of the body unit 100 by opening the outlet 110.

On the other hand, fines P, in a state of not being granulated because particles thereof are small, enters into the inside of the body unit 100 by being contained in the granulated radioactive waste R, wherein the present disclosure separates the fines P to re-supply same to the radioactive liquid waste granulator 10 so as to be reprocessed, thereby manufacturing granulation of no less than a certain size, so that high-efficiency solidification treatment may be performed.

In addition, the granulated radioactive waste R, from which the fines P have been removed, is put inside a prescribed drum through an opening/closing port (not shown) separately provided at one side of a lower part of the body unit 100. After performing solidification treatment of the granulated radioactive waste R by spraying a solidifying agent (solidifying resin) such as polymer, paraffin, cement, or the like into the inside of the drum, the drum may be sealed, thereby preventing leakage of radioactivity.

The air supply unit 200 is provided on one side of the body unit 100 and is configured to spray air to the supplied granulated radioactive waste R at regular periods, thereby scattering and separating the fines P contained in the granulated radioactive waste R.

The air supply unit 200 includes: an air supply pipe 210 provided in a width direction inside the body unit 100 and formed with the plurality of air supply nozzles 211 in a circumferential direction along the width direction; and an air supply part 220 connected to the air supply pipe 210 and configured to supply air to the inside of the body unit 100 through the air supply pipe 210.

At least one air supply pipe 210 is provided in the form of a hollow pipe in the width direction inside the body unit 100, and the cross-section of the air supply pipe 210 may be provided in any one of a circular shape or a square shape.

In addition, the air supply pipe 210 may be provided to be located in the center inside the main body unit 100, thereby evenly spraying the air to the granulated radioactive waste R.

The plurality of the air supply nozzles 211 is formed in a circumferential direction along the width direction of the air supply pipe 210, wherein the plurality of the air supply nozzles 211 may be formed in a vertical direction or an oblique direction with an outer circumferential surface of the air supply pipe 210 as a reference.

At this time, as the plurality of the air supply nozzles 211 is formed in the oblique direction with the outer circumferential surface of the air supply pipe 210 as the reference, the air is sprayed in the oblique direction inside the body unit 100 and, through this, circulates inside the body unit 100 so that a vortex is formed.

That is, the air sprayed from the inside of the body unit 100 forms a vortex and may circulate inside the body unit 100 so that there is an effect of efficiently scattering and separating the fines P contained in the granulated radioactive waste R.

The air supply part 220 is connected to the air supply pipe 210 and is configured to supply the air at a predetermined pressure to the inside of the body unit 100 through the air supply pipe 210.

Such an air supply part 220 may include any devices such as a compressor, a blower, and the like configured to supply air.

In addition, between the air supply pipe 210 and the air supply part 220, between the air supply pipe 210 and an air chamber 230 to be described below, or between the air chamber 230 to be described below and the air supply part 220, at least one opening/closing valve such as a solenoid valve, a check valve, a fly valve, and the like may be installed to perform the supply and blocking of the air.

Meanwhile, the air sprayed from the air supply pipe 210 may be sprayed according to a predetermined period (pulse type).

In such a predetermined period, the air supply part 220 may control the supply of the air, or the opening and closing of the above-described valve is controlled, whereby the air may be sprayed according to the predetermined period.

For example, the air sprayed from the air supply pipe 210 may be sprayed while repeating operation such that the air is continuously sprayed for four to six seconds and then stands by for one to three seconds.

When the air is sprayed continuously rather than is sprayed according to a predetermined period, the granulated radioactive waste R is scattered by the supply pressure of the supplied air, and there is a problem in that the fines P may not be efficiently separated as the granulated radioactive waste R and the fines P are scattered at the same time.

That is, the particles of the fines P are smaller than the particles of the granulated radioactive waste R so have a weight relatively lighter than the particles of the granulated radioactive waste R. Therefore, the particles of the fines P may be scattered by the air sprayed at a regular pressure from the supply pipe 210.

In conclusion, the air sprayed from the air supply pipe 210 scatters the fines P contained in the granulated radioactive waste R by being sprayed according to the predetermined period, so that the separation of the fines P may be efficiently performed.

In addition, a driving motor (not shown) configured to rotate the air supply pipe 210 may be provided at one side of the air supply unit 200.

Such a driving motor (not shown) is configured to rotate the air supply pipe 210 at a regular speed and to allow the air to be sprayed, so that the separation of the fines P may be efficiently performed.

In addition, the air sprayed through the plurality of air supply nozzles 211 formed in the circumferential direction of the air supply pipe 210 scatters fines contained in the granulated radioactive waste R dispersed in the inner blind spot of the body unit 100, so that the reprocessing may be efficiently performed.

Meanwhile, the air chamber 230 configured to collect the supplied air may be further included between the air supply pipe 210 and the air supply part 220.

More specifically, the air chamber 230 is connected to one side of the air supply part 220 and configured to collect the air supplied from the air supply part 220 and to supply the collected air to the air supply pipe 210, thereby supplying sufficient air to the air supply pipe 210 without a shortage of the air supply.

The reprocessing unit 300 is provided in a vacuum state on an opposite side of the body unit 100 and configured to allow the scattered fines P to be transferred to the radioactive waste granulator 10 along a transfer pipe 320 by vacuum pressure when a second opening/closing valve 310 provided on one side of the body unit 100 is operated.

More specifically, the transfer pipe 320 is connected to the opposite side of the main body unit 100 and to the one side of the radioactive waste liquid granulator 10.

The inside of the transfer pipe 320 is always maintained in a vacuum state, and when an opening/closing valve (not shown) provided at one side of the radioactive waste granulator 10 is opened at the same time as the second opening/closing valve 310 is opened, a pressure difference is generated between the inside of the body unit 100 and the inside of the transfer pipe 320.

By the pressure difference generated in such a way, the fines P scattered inside the main body unit 100 are automatically sucked and transferred to the radioactive waste liquid granulator 10 through the transfer pipe 320. Subsequently, a reprocessing process of re-granulating the fines P may be performed.

By the pressure difference generated in this way, the fines P scattered inside the body unit 100 are automatically sucked and are retransferred to the radioactive waste liquid granulator 10 through the transfer pipe 320, thereby performing a reprocessing process in which the fines P are regranulated.

Here, an internal degree of vacuum of the transfer pipe 320 is maintained at the degree of vacuum no less than 40 cmHg to no greater than 70 cmHg. When the internal degree of vacuum of the transfer pipe 320 is less than 40 cmHg, the pressure difference between the inside of the body unit 100 and the inside of the transfer pipe 320 is small, so there is a problem in that the fines P may not be sucked.

In addition, when the internal degree of vacuum of the transfer pipe 320 is more than 70 cmHg, the pressure difference between the inside of the unit 100 and the inside of the transfer pipe 320 increases, so that the granulated radioactive waste R in addition to the fines P passes through the fines separation filter 330, which will be described below, and is put inside the radioactive waste liquid granulator 10 again. Accordingly, the reprocessing process needs to be inevitably performed, resulting in an inefficient problem.

Therefore, the degree of vacuum of the inside of the transfer pipe 320 may be maintained at the degree of vacuum of no less than 40 cmHg to no greater than 70 cmHg.

In addition, it is noted that a vacuum pump and the like configured to maintain a vacuum state at all times is provided on one side of the transfer pipe 320 so that the inside of the transfer pipe 320 may be implemented in a vacuum state at all times.

On the other hand, a fines separation filter configured to perform filtering of the granulated radioactive waste R of large-sized particles and the fines P of small-sized particles is included on a connection part, where the main unit and the reprocessing unit are connected to each other.

The fines separation filter 330 is configured to be curved at a predetermined angle and is provided in a mesh shape.

Here, the fines separation filter 330 may be configured to be curved at a predetermined angle toward the inside of the body unit 100 or to be curved at a predetermined angle toward the inside of the reprocessing unit 300. Nevertheless, the fines separation filter 330 may be configured to be curved toward the inside of the reprocessing unit 300.

In addition, the fines separation filter 330 is provided in a form of a mesh, wherein the mesh is configured to be no less than 0.6 mm to no greater than 0.8 mm. When the fine separation filter 330 is formed by the mesh less than 0.6 mm, the fines P having a predetermined size do not pass through the fines separation filter 330 and are contained in the granulated radioactive waste R so that solidification thereof is not performed. Accordingly, there is a problem in inefficiency such that the reprocessing process needs to be inevitably performed. In addition, when the fine separation filter 330 is formed by the mesh greater than 0.8 mm, the granulated radioactive waste R is not filtered out and is put inside the radioactive waste liquid granulator 10 again together with the fines P. Accordingly, there is a problem in inefficiency such that the reprocessing process needs to be inevitably performed.

Therefore, the fines separation filter 330 may be formed in the mesh of no less than 0.6 mm to no greater than 0.8 mm.

Meanwhile, a washing nozzle 340 configured to spray the air to the granulated radioactive waste R, having large-sized particles and adhered to the fines separation filter, is further included at one side from the fines separation filter 330.

When suction is started through the reprocessing unit 300, the fines P of small-sized particles pass through the fines separation filter 330. However, some of the granulated radioactive waste R of large-sized particles adhered to the fines separation filter 330 while being filtered out by the fines separation filter 330, so there is a problem of lowered filtering efficiency.

In order to solve such a problem, when the filtering of the fines P through the reprocessing unit 300 is completed, the washing nozzle 340 may spray the air at a predetermined pressure, thereby removing the granulated radioactive waste R from the fines separation filter 330, so that the filtering efficiency of the fines P may be increased.

In addition, the washing nozzle 340 is connected to the air supply part 220 and operates by receiving the air from the air supply part 220.

In addition, the washing nozzle 340 may be provided so as to spray on the front surface of the fines separation filter 330, thereby removing the granulated radioactive waste R from the fines separation filter 330.

Meanwhile, the air sprayed from the washing nozzle 340 may be sprayed according to a predetermined period (pulse type).

In such a predetermined period, the air supply part 220 may control the supply of the air, or the opening and closing of a separate opening/closing valve provided on one side of the air supply part 220 is controlled, whereby the air may be sprayed according to the predetermined period.

For example, the air sprayed from the washing nozzle 340 may be sprayed while repeating operation such that the air is continuously sprayed for four to six seconds and then stands by for one to three seconds.

When the air is sprayed continuously rather than is sprayed according to a predetermined period, there is a problem in that the removal efficiency of the granulated radioactive waste R adhered to the fines separation filter 330 is lowered.

In conclusion, the air sprayed from the washing nozzle 340 is sprayed according to the predetermined period, so that the granulated radioactive waste R adhered to the fines separation filter 330 may be efficiently removed.

In addition, one side of the washing nozzle 340 may be provided with a driving motor (not shown) configured to rotate the washing nozzle 340.

Such a driving motor (not shown) may rotate the washing nozzle 340 at a regular speed, whereby the granulated radioactive waste R adhered to the fines separation filter 330 may be effectively removed.

Therefore, according to the fines removal apparatus installed on the radioactive liquid waste granulator of the present disclosure, the air is sprayed on the granulated radioactive waste at the regular periods to separate and reprocess the fines contained in the granulated radioactive waste, whereby there is an effect of performing efficient solidification of the granulated radioactive liquid waste.

In addition, through the plurality of the air supply nozzles formed in the circumferential direction along the width direction of the air supply pipe, there is an effect of efficiently performing reprocessing by scattering the fines contained in the granulated radioactive waste dispersed in the internal blind spot of the body unit.

The embodiments described in the present specification and the configurations shown in the drawings are only the most exemplary embodiment of the present disclosure and do not represent all the technical spirit of the present disclosure, so it should be understood that there may be various equivalents and variations that may be substituted for the embodiments at the time of the present application.

What is claimed is:

1. A fines removal apparatus installed on a radioactive liquid waste granulator, the apparatus comprising:
   a body unit fastened to an outlet provided on the radioactive liquid waste granulator and configured to receive granulated radioactive waste by an operation of a first opening/closing valve provided at one side of the outlet, the radioactive liquid waste granulator being configured to manufacture concentrated liquid waste by evaporating moisture in radioactive liquid waste and to manufacture granulated radioactive waste by drying the concentrated liquid waste;

an air supply unit provided on one side of the body unit and configured to spray air to the supplied granulated radioactive waste at regular periods, thereby scattering and separating fines contained in the granulated radioactive waste;

a reprocessing unit provided in a vacuum state on an opposite side of the body unit and configured to allow the scattered fines to be transferred to the radioactive waste granulator along a transfer pipe by vacuum pressure when a second opening/closing valve provided on one side of the body unit is operated;

an air supply pipe provided in a width direction inside the body unit and formed with a plurality of air supply nozzles in a circumferential direction along the width direction; and an air supply part connected to the air supply pipe and configured to supply air to the inside of the body unit through the air supply pipe; and an air chamber provided between the air supply pipe and the air supply part and configured to collect the supplied air.

2. The apparatus of claim 1, further comprising:

a fines separation filter provided at a connection part, where the main unit and the reprocessing unit are connected to each other, the fines separation filter being configured to perform filtering of the granulated radioactive waste of large-sized particles and the fines of small-sized particles.

3. The apparatus of claim 2, wherein the fines separation filter is configured to be curved at a predetermined angle and to have a mesh shape.

4. The apparatus of claim 2, further comprising:

a washing nozzle provided at one side of the fines separation filter and configured to spray the air to the granulated radioactive waste having large-sized particles and being adhered to the fines separation filter.

* * * * *